No. 892,992. PATENTED JULY 14, 1908.
F. HEYER.
ROAD SCRAPER.
APPLICATION FILED OCT. 7, 1907.
2 SHEETS—SHEET 1.
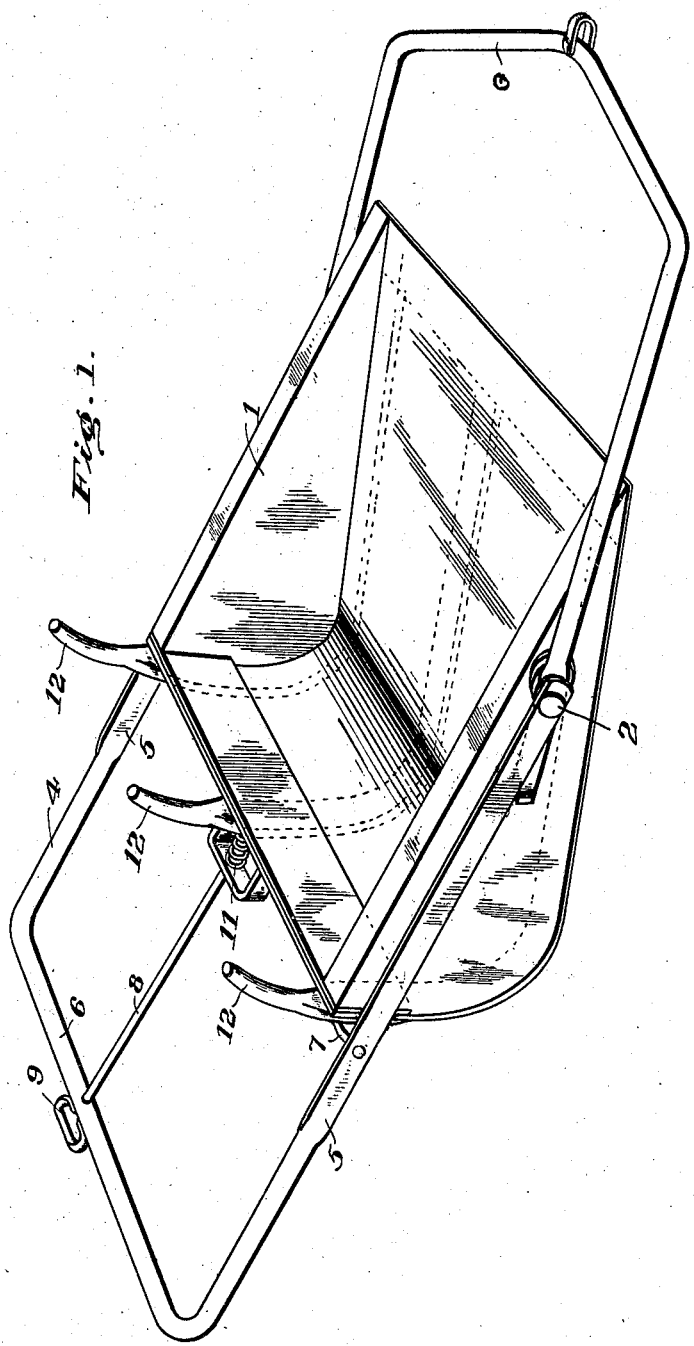
WITNESSES:
INVENTOR
F. Heyer.
BY
Attorneys

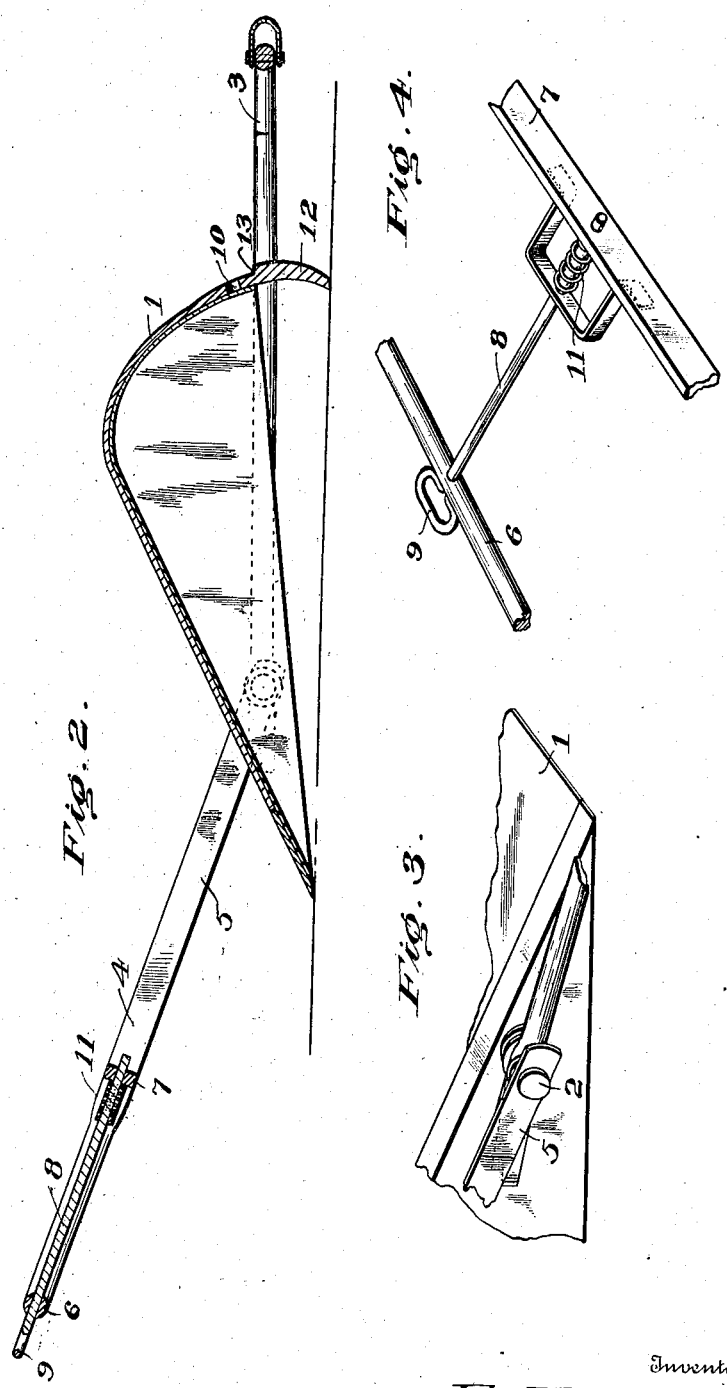

UNITED STATES PATENT OFFICE.

FRIEDRICH HEYER, OF HUBBARD, TEXAS.

ROAD-SCRAPER.

No. 892,992.   Specification of Letters Patent.   Patented July 14, 1908.

Application filed October 7, 1907. Serial No. 396,333.

*To all whom it may concern:*

Be it known that I, FRIEDRICH HEYER, citizen of the United States, residing at Hubbard, in the county of Hill and State of Texas, have invented certain new and useful Improvements in Road-Scrapers, of which the following is a specification.

The present invention relates to certain new and useful improvements in scrapers of that type which are employed for excavating purposes, and aims to provide a scraper which is peculiarly designed so as to automatically return to an upright position after having been dumped.

A further object of the invention is to design a scraper of this character which is simple and durable in its construction and will effectively withstand the hard usage to which such implements are subjected.

For a full description of the invention and the merits thereof and also to acquire a knowledge of the details of construction and the means for effecting the result, reference is to be had to the following description and accompanying drawings, in which:

Figure 1 is a perspective view of a scraper embodying the invention. Fig. 2 is a longitudinal sectional view through the scraper showing the same in the position assumed when dumped. Fig. 3 is a detail view of a portion of one side of the scraper showing the manner of connecting the handle frame and draft yoke thereto. Fig. 4 is a detail view of the latch bar.

Corresponding and like parts are referred to in the following description and indicated in all the views of the drawings by the same reference characters.

Referring to the drawings the numeral 1 designates the scraper which may be of any conventional construction. Projecting laterally from the opposite sides of the scraper 1 are the stub shafts 2 upon which the U-shaped yoke member 3 is pivoted, the said yoke member being designed to have the draft animals connected thereto. A rearwardly extending frame 4 is also pivotally mounted upon the stub shafts 2 and comprises the side bars 5 extending rearwardly upon opposite sides of the scraper 1 and connected by cross bars 6 and 7, the former serving as a handle for controlling the scraper, while the latter has a spring action as will be hereinafter more fully set forth. A latch bar 8 is slidably mounted upon the cross bars 6 and 7, the outer end of the latch bar projecting rearwardly and terminating in a handle 9 while the inner end is designed to engage a socket 10 in the scraper 1 for the purpose of locking the latter in an operative position. A coil spring 11 is shown in the present instance as utilized for forcing the latch bar inwardly where it normally engages the socket 10. Projecting upwardly from the rear edge of the scraper 1 is a series of teeth 12 the upper ends of which are beveled as shown. It will also be observed that these teeth 12 are provided at their base with shoulders 13 adapted to engage with the spring cross bar 7.

In the operation of the scraper the draft animals are connected to the yoke 3 and the device drawn around the excavation in the usual manner. When it is desired to dump the scraper the handle 6 is moved upwardly to a slight extent to cause the toe of the scraper to bite into the ground and the latch bar 8 withdrawn from the socket 10. The scraper is then dumped in the usual manner and the teeth 12 thrown into engagement with the surface of the ground as soon as the scraper has been swung into an inverted position. These teeth 12 operate to swing the scraper again into an upright position as the same is drawn forwardly by the draft animals, the spring cross bar 7 and the latch bar 8 being forced outwardly by the beveled ends of the teeth until they engage the shoulders 13 and socket 10 respectively. The scraper is then locked in normal position and can be drawn back to the excavation where the above described operation is repeated.

Having thus described the invention, what is claimed as new is:

1. The combination of a scraper, a draft member pivotally connected to the scraper, a frame pivotally connected to the scraper, means for locking the scraper in normal position, and a tooth projecting upwardly from the rear edge of the scraper for the purpose specified.

2. The combination of a scraper, a draft member applied to the scraper, a frame pivotally connected to the scraper and comprising a spring bar, means mounted upon the frame for locking the scraper in normal position, and a tooth projecting upwardly from the rear edge of the scraper for the purpose specified, the said tooth being adapted to engage the before mentioned spring bar of the frame.

3. The combination of a scraper, a draft member applied to the scraper, a frame pivotally connected to the scraper and comprising a spring cross bar, a latch bar mounted upon the frame for engaging the scraper to lock it in normal position, and teeth projecting upwardly from the rear edge of the frame for the purpose specified, the said teeth being formed with shoulders adapted to engage the before mentioned spring cross bar.

4. The combination of a scraper having stub shafts projecting from the opposite sides thereof, a yoke member pivotally mounted upon the stub shafts, a frame comprising rearwardly extending bars pivotally mounted upon the stub shafts, the rear portions of the bars being connected by cross bars, one of the said cross bars having a spring formation, a latch bar slidably mounted upon the cross bars and adapted to engage the scraper to hold it in normal position, and teeth projecting upwardly from the rear edge of the scraper for the purpose specified, the said teeth being provided with beveled ends and a shoulder for engagement with the before mentioned spring cross bar.

In testimony whereof I affix my signature in presence of two witnesses.

FRIEDRICH HEYER. [L. S.]

Witnesses:
 B. C. ROBERTS
 E. JARVIS.